United States Patent [19]

Young

[11] Patent Number: 4,970,821
[45] Date of Patent: Nov. 20, 1990

[54] FISHING TACKLE WRAPPER

[76] Inventor: William T. Young, 2236 Nellie St., Largo, Fla. 34644

[21] Appl. No.: 385,672

[22] Filed: Jul. 26, 1989

[51] Int. Cl.⁵ .............................................. A01K 97/00
[52] U.S. Cl. ...................................... 43/54.1; 43/57.1; 206/315.11; 150/113
[58] Field of Search .............................. 43/54.1, 57.1; 206/315.11, 466; 383/39; 150/154, 113

[56] References Cited

U.S. PATENT DOCUMENTS

| 599,370 | 2/1898 | Streator | 43/54.1 |
|---------|--------|----------|---------|
| 3,940,873 | 3/1976 | Lawless | 43/57.1 |
| 4,467,551 | 8/1984 | Pulver | 43/54.1 |
| 4,691,469 | 9/1987 | Alsobrook et al. | 43/54.1 |

Primary Examiner—Richard K. Seidel
Assistant Examiner—James Miner
Attorney, Agent, or Firm—Herbert W. Larson

[57] ABSTRACT

A heavy canvas type sheet of fabric has multiple rows of VELCRO ® type hook or loop members on a front surface from a top to bottom configuration. A top edge has a strap attached along with a pair of fastening rings. The strap descends along a back surface of the sheet below a bottom edge. Multiple plastic envelopes having hooks or loops closing the envelopes are attached by a corresponding strip containing hooks or loops along the back of each envelope to the hook or loop rows on the fabric. The envelopes can contain fishing lures and can be easily removed to attached to the fisherperson's clothes.

5 Claims, 3 Drawing Sheets

FISHING TACKLE WRAPPER

BACKGROUND OF THE INVENTION

1. Field of the Invention

This invention relates to combination storage and display wrappers. More particularly, it refers to a fabric holder for small items including fishing lures, hooks and other fishing paraphernalia used to either store the fishing tackle or display it in an easily accessible mode.

2. Description of the Prior Art

Hinged trays in plastic boxes are commonly used to store items such as fishing lures and hooks. These boxes frequently become doused with water or are lifted up unlatched. In either case, the box contents must be replaced in their trays to the general annoyance of the owner attempts have been made to improve storage equipment for fishing tackle. The February 1989 Florida Sportsman, pages 83 to 84 describes a satchel-type lure holder having zipper pockets The lure holders are permanently attached to the cloth backing. This type holder is expensive in view of the large number of zippers required to close all the lure holders. A more versatile tackle holder is needed so that the lures are easily accessible, but can be stored without fear of the tackle getting wet or falling out of its container due to careless handling.

SUMMARY OF THE INVENTION

I have invented a tackle wrapper that retains lures, hooks and other fishing gear in a dry condition. In addition, the lures can be easily displayed and retrieved and the wrapper is almost idiot proof in its ability to retain the fishing equipment without tangles or snarls.

My tackle wrapper is made from a fabric sheet having two long side edges and a top and bottom edge. VELCRO ® type loop or hook materials are attached to a front surface of the fabric sheet in multiple thin rows (about one inch wide) from the top to the bottom edge. A strap with two rings is attached along a back surface of the fabric sheet adjacent the top edge and is allowed to hang down below the lower edge.

Multiple heavy weight plastic envelopes having a top opening containing on opposite top inner edges closely spaced hooks or loops are used to hold the lures. Each envelope is closed by engaging the corresponding closely spaced loops or hooks. A back surface of the envelope has a row of hooks or loops to engage a corresponding row on the fabric sheet. The envelopes have small bottom end holes to allow water to exit. The top edge of the fabric sheet has a plastic sheet stitched in place overlapping the top row of envelopes with each envelope overlapping an envelope below it on another row.

The fabric sheet can be rolled together from its bottom edge to its top edge and tied with the strap through the rings or it can be hung on the rings in a display mode so that envelopes can be removed for easy retrieval of lures.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figures 1, 2:
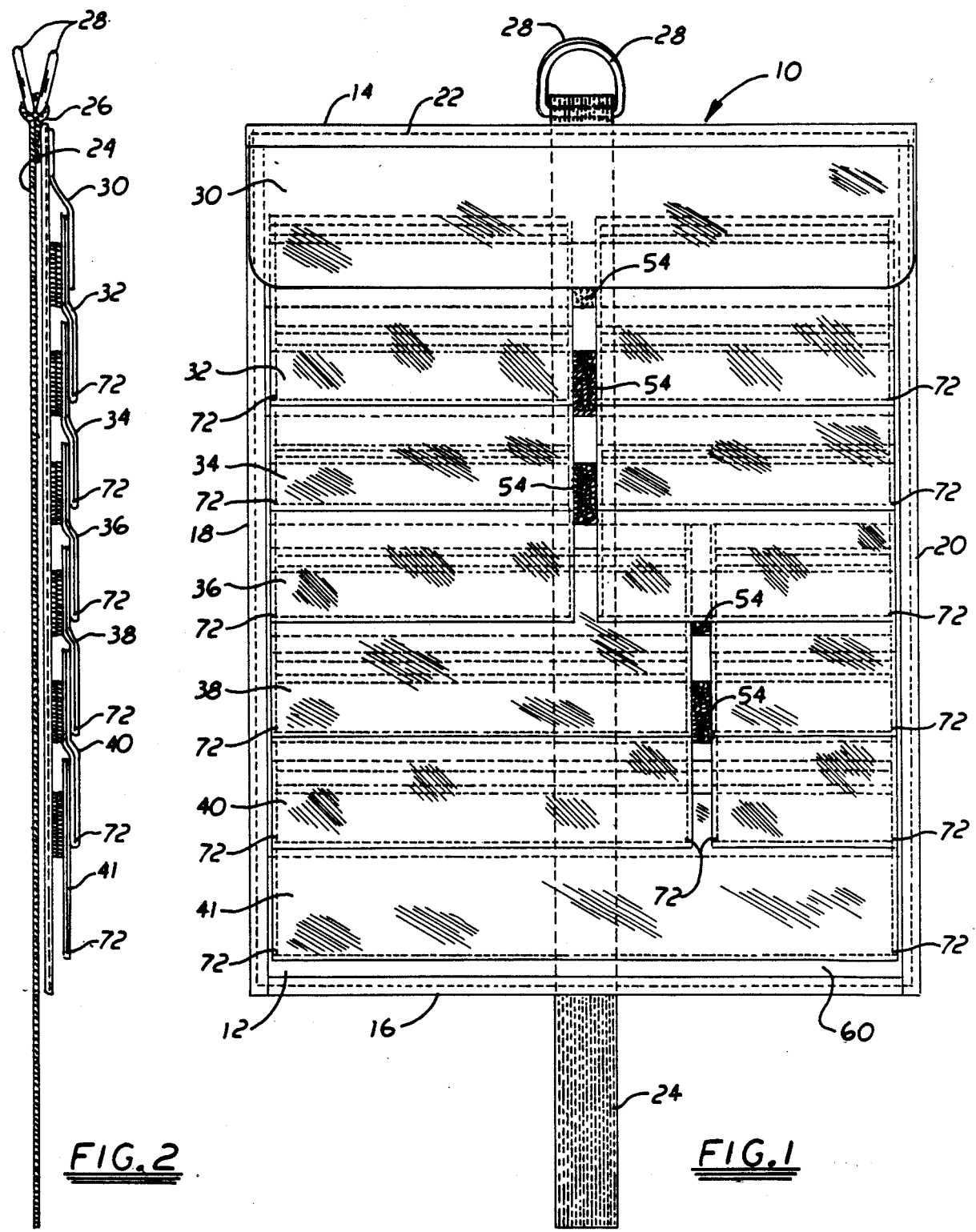
FIG. 1 is a front view in elevation of the display or open mode of the wrapper.
FIG. 2 is a side view of the open mode of the wrapper.

Throughout the following detailed description, the same reference numerals refer to the same elements in all figures.

The tackle wrapper 10 as shown in FIG. 1 consists of a heavy sheet 12 of a canvas type material. This material may be the type used for boat covers or boat shelters but must be of a heavy grade and is bound over along its top edge 14, bottom edge 16 and side edges 18 and 20 and stitched 22 so that a thick outer seam is created. A first end of a strap 24 is sewn to sheet 12 adjacent the top edge 14 with a turned in portion 26 that is threaded to a pair of rings 28. The strap 24 drapes down beyond the lower edge 16 of the sheet 12.

Figure 3:
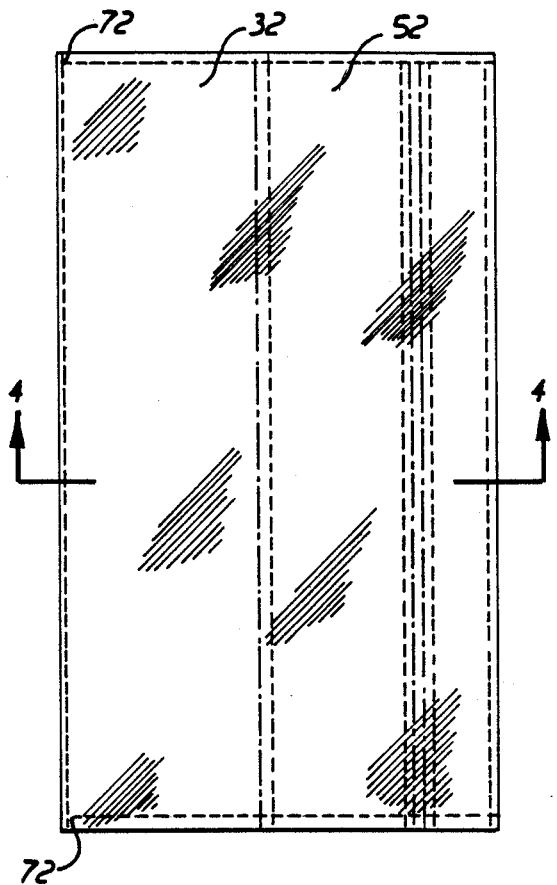
FIG. 3 is a top plan view of one of the carrier envelopes removed from the wrapper.
Figure 4:
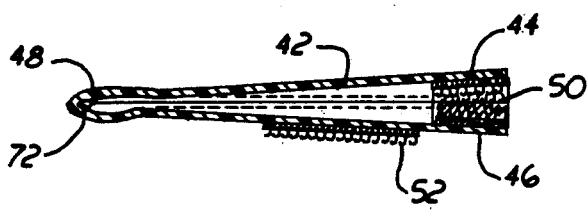
FIG. 4 is a section view along lines 4—4 of FIG. 3.

As seen in FIG. 2 a top sheet 30 made of a heavy grade of plastic, such as polyvinyl chloride, is sewn along the seam 22 adjacent to the top edge 14. This heavy vinyl plastic sheet 30 drapes down over the top envelope 32 which in turn is draped over each lower envelope 34. In turn 34 drapes over 36, 36 drapes over 38, 38 drapes over 40 and 40 over 41 so that there is a descending overlapping relationship of the vinyl materials. Each of the envelopes 32, 34, 36, 38, 40 and 41, as shown in FIGS. 3 and 4, have a V-shaped configuration 42 so that integral front sheet 44 and back sheet 46 diverge slightly from a base point 48. The top portion 50 has a hook or loop configuration attached to the inside surface of sheet 44 and either a hook or a loop correspondingly attached to the inside surface of sheet 46 near its top 50. By closing the corresponding hook and loops, the top of the envelope is sealed. Back sheet 46 of the envelope has a strip of material consisting of either hooks or loops 52 for engaging a corresponding strip 54 of either hooks or loops permanently affixed in top to bottom rows over the front surface 60 of fabric 12 shown in FIG. 1.

Figure 5:
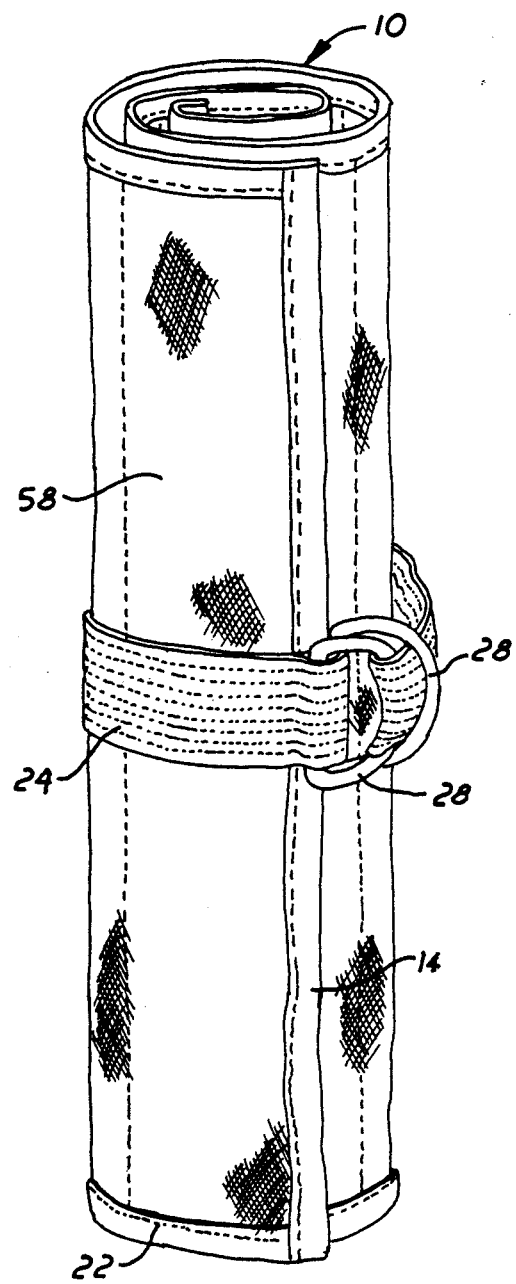
FIG. 5 is a front view in elevation of the closed or stored mode of the wrapper.
Figure 6:
FIG. 6 is a view of a fisherperson with carrier envelopes removed from the wrapper attached to his/her clothes.

The sheet 12 can be rolled from its bottom edge 16 inwardly and tied through rings 28 by strap 24 as seen in FIG. 5. The back surface 58 of the wrapper 10 is exposed solely in the wrapped up position. The front surface 60 of the tackle wrapper 10 in shown in FIG. 1.

The envelopes 32, 34, 36, 38, 40 or 41 can be removed from the hook or loop configuration on strip 54 and attached to a person 62 merely by attaching to a hook or loop strip 64 on a hat 66 or on a hook or loop strip 68 on a jacket 70. In this manner, the envelopes can be removed from the tackle wrapper 10 and individual lures can be used away from the tackle wrapper 10 by the fisherperson. When the fisherperson is finished, the lures can be replaced into the envelopes and the envelope replaced on the sheet front surface 60 on appropriate strip 54. Small holes 72 at the bottom 48 of each envelope allow water to drip out of the envelope when the tackle wrapper 10 is in a displayed mode as shown in FIG. 1.

The tackle wrapper 10 promotes neatness and organization in a fisherperson's tackle. All the gear is visible but tangle-free. The removable envelopes enable the fisherperson to take what he/she wants and either stuff them in his/her pocket or attach them to hook or loop strips on his/her clothes.

Individual envelopes are preferable constructed with 20 gauge clear polyvinyl chloride. The hooks or loops used to close these bags have a density of about 330 hooks or loops per inch. The hook or loops are about 8 mm high. The polyvinyl chloride flap sheet 30 is preferable made of 30 gauge clear polyvinyl chloride.

The individual envelopes 32, 34, 36, 38, 40 or 41 are opened by pulling apart the hooks and loops at the sides 44 and 46. Then the ends are pushed inward to create an opening for the easiest removal or placement of a lure in the envelope. It is preferable to put the plugs, or fishing lures in tail first and remove the lures by taking the head out first. It is rare that hooks puncture the vinyl envelope, especially if attention is paid as to how the hooks are lying in the envelope.

The wrappers or sheet 12 is preferably made of 100% acrylic woven marine fabric. The tackle wrapper 10 can be rinsed off open or closed and water wil]not get into the individual envelope. If the envelope does receive any water, it can be removed by merely shaking the tackle wrapper 10 and the water will drain out the outside corners 72 of each envelope.

The tackle wrapper 10 can come in many sizes and although shown in the drawings as having a rectangular appearance, the wrapper could be square or have many other shapes. In each instance where hook or loop material is used, it is understood that the hooks will be used on one engaging surface and loops on the corresponding surface.

Although primarily designed for fishing tackle, other small items such as nails, buttons or screws can be stored and displayed in the wrapper of this invention.

Having thus described the invention, what is claimed and desired to be secured by Letters Patent is:

1. A display and storage wrapper for small items comprising:

a fabric sheet of heavy weight having two longer side edges in comparison to a first top and second bottom end edge, all edges being bound and sewn in place, a pair of strap receiving rings depending outwardly from the first end edge of the sheet, a fabric strap attached to the first end edge of the sheet holding the rings in place at a first end of the strap with the strap hanging downward along a rear surface of the sheet, the strap extending beyond the length of the side edges, multiple narrow plastic strips containing multiple closely spaced loop or hook members projecting from one side of the plastic strips, the plastic strips being attached on a side opposite the loop or hook members to a first face of the fabric sheet, multiple heavy weight plastic envelopes having closely spaced loop or hook members on a back surface secured to the corresponding loop or hook members on the fabric sheet, the envelopes having a water exiting space at each lower outside corner and an opening at a top edge for receiving the small items being sealed together by opposing hooks or loops, an envelope proximal to the first end edge of the fabric sheet being overlapped by a plastic sheet attached adjacent the top end edge on a front face of the fabric sheet, the fabric sheet being rollable around the plastic envelopes and tied together in a roll fashion by inserting the fabric strap between the rings.

2. The wrapper according to claim 1 wherein the fabric sheet is acrylic woven marine fabric.

3. The wrapper according to claim 2 wherein the envelopes are made from clear polyvinyl chloride and have a gauge of at least twenty.

4. The wrapper according to claim 1 wherein the small items contained in the envelopes are fishing lures.

5. The wrapper according to claim 1 wherein the envelopes have V-shape in end view containing on an inner upper surface closely spaced hook or loop members for engaging with a corresponding closely spaced loop or hook member on an opposite inner upper surface of the envelope.

* * * * *